US 8,538,596 B2

United States Patent
Gu et al.

(10) Patent No.: US 8,538,596 B2
(45) Date of Patent: Sep. 17, 2013

(54) LIGHT TIMEOUT OPTIMIZATION

(75) Inventors: Xin Gu, Greendale, WI (US); Kelvin Gu, Petaluma, CA (US); Deepak Nulu, Fremont, CA (US)

(73) Assignee: Redwood Systems, Inc., Fremont, CA (US)

(*) Notice: Subject to any disclaimer, the term of this patent is extended or adjusted under 35 U.S.C. 154(b) by 303 days.

(21) Appl. No.: 12/973,425

(22) Filed: Dec. 20, 2010

(65) Prior Publication Data
US 2012/0153868 A1    Jun. 21, 2012

(51) Int. Cl.
*G06F 17/00* (2006.01)
*G05D 3/12* (2006.01)
*G08B 21/00* (2006.01)
*G08B 13/00* (2006.01)
*G08B 13/18* (2006.01)
*G08B 13/08* (2006.01)
*H01J 1/60* (2006.01)
*H05B 37/02* (2006.01)
*H01H 7/00* (2006.01)

(52) U.S. Cl.
USPC ........... 700/295; 700/90; 700/291; 340/540; 340/541; 340/552; 340/545.1; 315/129; 315/360; 307/141

(58) Field of Classification Search
USPC ........... 340/540, 541, 552, 545.1; 315/129, 315/360; 700/90, 291, 295; 307/141
See application file for complete search history.

(56) References Cited

U.S. PATENT DOCUMENTS

| 5,640,143 | A | 6/1997 | Myron et al. ........... 340/541 |
| 5,971,597 | A | 10/1999 | Baldwin et al. ......... 364/528.12 |
| 6,122,678 | A | 9/2000 | Eckel et al. ............ 710/15 |
| 6,759,954 | B1 | 7/2004 | Myron et al. ........... 340/522 |
| 7,155,317 | B1* | 12/2006 | Tran ..................... 700/259 |
| 7,486,193 | B2 | 2/2009 | Elwell .................. 340/573.1 |
| 7,623,042 | B2 | 11/2009 | Juiizenga ............... 340/61 |

(Continued)

FOREIGN PATENT DOCUMENTS

| GB | 2 449 987 A | 12/2008 |
| WO | WO 96/25021 | 8/1996 |
| WO | WO 98/34206 | 8/1998 |
| WO | WO 99/40453 | 8/1999 |

OTHER PUBLICATIONS

Extended European Search Report, dated Feb. 13, 2012, pp. 1-5, European Patent Application No. 11009394.5, European Patent Office, Germany.

(Continued)

*Primary Examiner* — Kavita Padmanabhan
*Assistant Examiner* — Darrin Dunn

(57) ABSTRACT

A lighting controller may optimize a timeout value of a lamp based on the goals of saving energy and providing occupant comfort. The lamp may illuminate a lighting area. The lighting controller may determine a false-negative rate for the lamp from sensor data that represents a frequency at which the lamp is timed out while the lighting area is occupied. The lighting controller may adjust the timeout value of the lamp over time so that the false-negative rate approaches a threshold false-negative rate. The false-negatives and occupancy periods may be detected from spikes in time distributions of motion data. The amount of energy that the lamp would consume at an increased timeout value of the lamp may be determined from motion data stored while the timeout value of the lamp is at an initial timeout value.

21 Claims, 7 Drawing Sheets

(56) References Cited

U.S. PATENT DOCUMENTS

| | | | |
|---|---|---|---|
| 7,688,005 B2 | 3/2010 | Reid | 315/307 |
| 2007/0273307 A1 | 11/2007 | Westrick et al. | 315/312 |
| 2007/0279895 A1 | 12/2007 | Clark et al. | 362/127 |
| 2010/0026479 A1 | 2/2010 | Tran | 340/501 |
| 2010/0097226 A1* | 4/2010 | Parsons | 340/573.1 |
| 2010/0102760 A1* | 4/2010 | Reid et al. | 315/360 |
| 2010/0103041 A1* | 4/2010 | Tomita | 342/357.15 |
| 2010/0113084 A1* | 5/2010 | Kelly | 455/522 |
| 2011/0133655 A1* | 6/2011 | Recker et al. | 315/159 |
| 2011/0191032 A1* | 8/2011 | Moore | 702/14 |
| 2012/0143357 A1* | 6/2012 | Chemel et al. | 700/90 |
| 2012/0248987 A1* | 10/2012 | Zaveruha et al. | 315/129 |

OTHER PUBLICATIONS

Börger, Egon et al., Capturing Requirements by Abstract State Machines: The Light Control Case Study, 2000, pp. 597-620, vol. 6, No. 7, Springer Pub. Co.

Dong, Bing et al., Sensor-Based Occupancy Behavioral Pattern Recognition for Energy and Comfort Management in Intelligent Buildings, 2009, pp. 1444-1451.

Garg, Vishal et al., Smart Occupancy Sensors to Reduce Energy Consumption, 2000, pp. 81-87, Elsevier, www.eisevier.com.

NLight, Lighting Control System, downloaded Sep. 2010, pp. 1-8, www.sensors.switch.com, Wallingford, CT.

Park, Heemin et al., Design and Implementation of a Wireless Sensor Network for Intelligent Light Control, 2007, pp. 1-10, IPSN, Cambridge, MA.

Dual Relay Multi-Technology Wall Switch Occupancy Sensors, 2008, pp. 1-6, Leviton Mfg. Co., Inc., www.leviton.com.

Sandhu, Jaspal S. et al., Wireless Sensor Networks for Commercial Lighting Control: Decision Making with Multi-agent Systems, 2004.

* cited by examiner

LIGHT TIMEOUT OPTIMIZATION

BACKGROUND

1. Technical Field

This application relates to lighting and, in particular, to light timeouts.

2. Related Art

An occupancy sensor may detect whether an area is occupied. A device may switch off lights if the occupancy sensor indicates that the area is not occupied. The device may switch on lights if the occupancy sensor indicates that the area is occupied.

SUMMARY

A lighting controller may be provided for optimizing a timeout value of a lamp that illuminates a lighting area. The lighting controller may include a memory, an occupancy model, and a demand model. The memory may include sensor data. The occupancy model may determine a false-negative rate for the lamp from the sensor data. The false-negative rate may include a frequency at which the lamp is timed out when the lighting area is occupied. The demand model may increase the timeout value of the lamp in response to the false-negative rate being above a threshold false-negative rate. Furthermore, the demand model may decrease the timeout value of the lamp in response to the false-negative rate being below the threshold false-negative rate.

A tangible non-transitory computer-readable medium may be provided that is encoded with computer executable instructions to optimize a timeout value of a lamp that illuminates a lighting area. The instructions, when executed, may determine a false-negative rate for the lamp from sensor data, where the false-negative rate is a frequency at which the lamp is timed out when the lighting area is occupied. The timeout value of the lamp may be increased in response to a determination that the false-negative rate is above a threshold false-negative rate. The timeout value of the lamp may be decreased in response to a determination that the false-negative rate is below the threshold false-negative rate.

A method may be provided that optimizes a timeout value of a lamp that illuminates a lighting area. A false-negative rate for the lamp is determined from sensor data. The false-negative rate may be a frequency at which the lamp is timed out when the lighting area is occupied. The timeout value of the lamp may be increased in response to the false-negative rate being above a threshold false-negative rate. In contrast, the timeout value of the lamp may be decreased in response to the false-negative rate being below the threshold false-negative rate.

A method may be provided that optimizes a timeout value of a lamp that illuminates a lighting area. Motion trips may be detected. Durations may be determined, where each respective one of the durations is a time difference between two consecutive motion trips. The number of the durations that are within a first time range may be determined where the first time range includes values larger than the timeout value of the lamp.

The number of the durations that are within a second time range may be determined. The number of false-negatives that occurred may be determined based on the number of durations in the first time range and the number of durations in the second time range. The false-negatives may be conditions that occur when the lamp is timed out while the lighting area is occupied. The timeout value of the lamp may be adjusted based on the number of false-negatives.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

1. Lighting System

A lighting system may include light fixtures that provide light to a physical site or multiple sites. A control system may interpret, control, and learn aspects of the operation of the light system based on management goals set by an operator or user. In one example, the lighting system may include the control system. In a second example, the two systems may be physically separate from each other. In a third example, the lighting and control systems may be intermixed.

The lighting system, the control system, or both may be capable of controlling one or more small residential buildings, such as single-family homes, and one or more large commercial sites, such as office buildings, building campuses, factories, warehouses, and retail stores. The lighting system may control and obtain sensor data at rather high degrees of spatial resolution, such as receiving sensor data from each individual light fixture. Alternatively or in addition, one lighting area lit by multiple light fixtures may be controlled by sensor data received by a single sensor. The high resolution may increase the complexity of operating the systems through a traditional control system. Nevertheless, the control system may greatly increase overall system performance and simplify operation of the lighting system.

Figure 1:
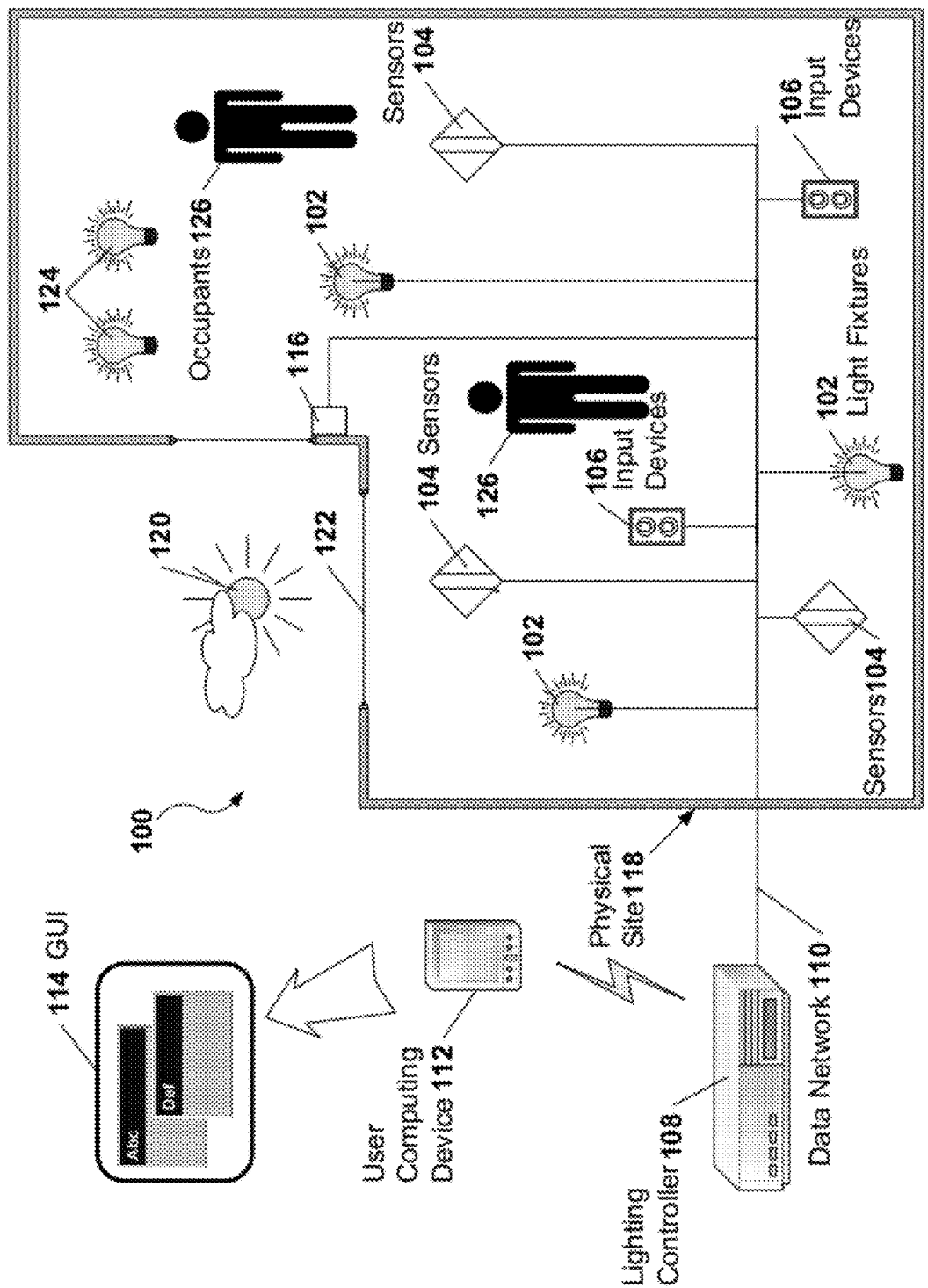
FIG. 1 illustrates an example of a lighting system.

FIG. 1 illustrates an example of a lighting system 100. The lighting system 100 may include light fixtures 102, sensors 104, input devices 106, and a lighting controller 108. The lighting system 100 may include additional, fewer, or different components. For example, the lighting system 100 may also include a data network 110. In one example, the lighting system 100 may not include the lighting controller 108, but include one or more power devices (not shown) that power the light fixtures 102 and that are in communication with the lighting controller 108 over a communications network, such as the data network 110. In a second example, the lighting system 100 may include at least one user computing device 112, such as a tablet computer, that hosts a graphical user interface (GUI) 114 and that is in wireless and/or wireline communication with the lighting controller 108 over the communications network. In a third example, the lighting system 100 may include load devices in addition to the light fixtures 102. For example, the load devices may include a switchable window 116 that adjusts the opacity of the window or position of an awning or louvers or other surface though which light may pass, be blocked, or be moderated based on an electric signal.

The light fixtures 102, the sensors 104, and the input devices 106 may be affixed to, attached to, or otherwise associated with a physical site 118. The physical site 118 may include any human-made structure used or intended for supporting or sheltering any continuous or non-continuous use or occupancy. For example, the physical site 118 may include a residential home, a commercial structure, a mobile home, or any other structure that provides shelter to humans, animals, mobile robotic devices, or any other tangible items. The physical site 118 may include any number of lighting areas that are illuminated by one or more of the light fixtures 102. Alternatively or in addition, one or more of the lighting areas may be outside of the physical site 118.

The lighting controller 108 may be in communication with the light fixtures 102, the sensors 104, and the input devices 106 over the data network 110. The data network 110 may be a communications bus, a local area network (LAN), a Power over Ethernet (PoE) network, a wireless local area network (WLAN), a personal area network (PAN), a wide area network (WAN), the Internet, Broadband over Power Line (BPL), any other now known or later developed communications network, or any combination thereof. For example, the data network 110 may include wiring electrically coupling the lighting controller 108 to devices, such as the light fixtures 102, the sensors 104, and the input devices 106, where the wiring carries both power and data. Alternatively, the data network 110 may include an overlay network dedicated to communication and another network that delivers power to the devices.

The light fixtures 102 may include any electrical device or combination of devices that create artificial light from electricity. The light fixture 102 may distribute, filter or transform the light from one or more lamps included or installed in the light fixture 102. Alternatively or in addition, the light fixture 102 may include one or more lamps and/or ballasts. The lamps may include an incandescent bulb, a LED (Light-emitting Diode) light, a fluorescent light, a CFL (compact fluorescent lamp), a CCFL (Cold Cathode Fluorescent Lamp), halogen lamp, or any other device now known or later discovered that generates artificial light. Examples of the light fixture 102 include a task/wall bracket fixture, a linear fluorescent high-bay, a spot light, a recessed louver light, a desk lamp, a commercial troffer, or any other device that includes one or more lamps. References to the light fixtures 102 may also be understood to apply to one or more lamps within the light fixtures 102.

The sensors 104 may include a photosensor, an infrared motion sensor, any other motion detector, a thermometer, a particulate sensor, a radioactivity sensor, any other type of device that measures a physical quantity and converts the quantity into an electromagnetic signal, or any combination thereof. For example, the sensors 104 may measure the quantity of $O_2$, $CO_2$, CO, VOC (volatile organic compound), humidity, evaporated LPG (liquefied petroleum gas), NG (natural gas), radon or mold in air; measure the quantity of LPG, NG, or other fuel in a tank; and/or measure sound waves with a microphone, an ultrasonic transducer, or any combination thereof.

The input devices 106 may include any device or combination of devices that receives input from a person or a device. Examples of the input devices 106 include a phone, a wall light switch, a dimmer switch, a switch for opening doors, any device that may control light fixtures 102 directly or indirectly, any device used for security purposes or for detecting an occupant, a dongle, a RFID (radio frequency identifier) card, RFID readers, badge readers, a remote control, or any other suitable input device.

The lighting controller 108 may include a device or combination of devices that controls the light fixtures 102 in the lighting system 100. Examples of the lighting controller 108 may include a microcontroller, a central processing unit, a FPGA (field programmable gate array), a server computer, a desktop computer, a laptop, a cluster of general purpose computers, a dedicated hardware device, a panel controller, or any combination thereof. One example of the lighting controller 108 includes the goal-based lighting controller described in U.S. patent application Ser. No. 12/815,886, entitled "GOAL-BASED CONTROL OF LIGHTING" filed Jun. 15, 2010, the entire contents of which are incorporated by reference. The lighting controller 108 may be located in the physical site 118, outside of the physical site 118, such as in a parking garage, outdoor closet, in a base of a street light, in a remote data center, or any other location.

The user computing device 112 may include a device that hosts the GUI 114. Examples of the user computing device 112 include a desktop computer, a handheld device, a laptop computer, a tablet computer, a personal digital assistant, a mobile phone, and a server computer. The user computing device 112 may be a special purpose device dedicated to a particular software application or a general purpose device. The user computing device 112 may be in communication with the lighting controller 108 over a communications network, such as the data network 110. Alternatively or in addition, the lighting controller 108 may host the GUI 114 and the operator may interact with the lighting controller 108 directly without the use of the user computing device 112.

The graphical user interface (GUI) 114 may be any component through which people interact with software or electronic devices, such as computers, hand-held devices, portable media players, gaming devices, household appliances, office equipment, displays, or any other suitable device. The GUI 114 may include graphical elements that present information and available actions to a user. Examples of the graphical elements include text, text-based menus, text-based navigation, visual indicators other than text, graphical icons, and labels. The available actions may be performed in response to direct manipulation of the graphical elements or to any other manner of receiving information from humans. For example, the GUI 114 may receive the information from the manipulation of the graphical elements though a touch screen, a mouse, a keyboard, a microphone or any other suitable input device. More generally, the GUI 114 may be software, hardware, or a combination thereof, through which people—users—interact with a machine, device, computer program or any combination thereof.

The lighting system 100 may include any number and type of load devices. A load device may be any device that may be powered by the lighting controller 108, the power device, or any combination thereof. Examples of the load devices may include the light fixtures 102, the sensors 104, the user inputs 106, the switchable window 116, a ceiling fan motor, a servomotor in an HVAC (Heating, Ventilating, and Air Conditioning) system to control the flow of air in a duct, an actuator that adjusts louvers in a window or a blind, an actuator that adjusts a window shade or a shutter, devices included in other systems, thermostats, photovoltaics, solar heaters, or any other type device. Alternatively or in addition, the lighting controller 108, the power device, or any combination thereof, may communicate with the load devices.

The power device may be any device or combination of devices that powers one or more load devices, such as the light fixtures 102. In one example, the power device may both power and communicate with the load devices. In a second example, the power device may power the load devices while the lighting controller 108 may communicate with the load devices and the power device. In a third example, the lighting controller 108 may include the power device. In a fourth example, the lighting controller 108 may be in communication with the power device, where the two are separate devices.

During operation of the lighting system 100, the operator may interact with the lighting controller 108 through the GUI 114. For example, the operator may configure parameters through the GUI 114. The parameters may include timeout values, power levels, management goals related to the operation of the lighting system 100, and other settings. The lighting controller 108 may control the load devices, such as the light fixtures 102, throughout the physical site 118 so as to achieve the management goals, set the power levels, implement the timeout values, or otherwise operate the lighting system 100 in accordance with the parameters.

In one example, the lighting controller 108 may directly control the power levels delivered to load devices, receive sensor data from the sensors 104, and receive input from the input devices 106 over the data network 110. In a second example, the lighting controller 108 may communicate with the power device in order to direct the power device to control the power levels delivered to load devices, to receive sensor data from the sensors 104, and to receive input from the input devices 106.

The physical site 118 may be illuminated from light generated by the light fixtures 102 as controlled by the lighting controller 108. Additionally, the physical site 118 may be illuminated from natural light 120. For example, the natural light 120 may pass through wall windows 122 or skylights. Alternatively or in addition, artificial light 124 not under the control of the lighting system 100, such as light from a pre-existing system, may illuminate at least a portion of the physical site 118.

Occupants 126 may live in, work in, pass through, or otherwise move within the physical site 118. The occupants 126 may be people, animals, or any other living creature or any object that moves, such as a mobile robotic device.

The lighting area may be occupied when one or more of the occupants 126 is in the lighting area. Alternatively or in addition, the lighting area may be occupied when data, such as the sensor data, indicates that one or more of the occupants 126 is in the lighting area.

In one example, the sensors 104 may be distributed throughout the physical site 118 with a high enough concentration of the sensors 104 so that sensor data covers the entire physical site 118 or desired locations within the physical site 118. For example, the sensors 104 may be located at each one of the light fixtures 102 or in each lighting area. Alternatively or in addition, fewer sensors 104 may be located in the lighting area than light fixtures. Sensor data covers a particular area, when the sensor data provides information about any physical location within the area. The sensors 104 may detect the presence of the occupants 126 throughout the physical site 118. The sensors 104 may measure site parameters that reflect measured characteristics of the physical site 118 and device parameters that reflect measured characteristics of devices, such as the load devices, or any combination thereof. Examples of site parameters may include down ambient light, side ambient light, room air temperature, plenum air temperature, humidity, carbon monoxide, or any other physical property. Examples of device parameters may include power consumption, current flow, voltages, operating temperature, and operational status.

The lighting controller 108 may include spatial orientation information about the sensors 104. For example, the relative locations of the sensors 104 and the light fixtures 102 may be stored in memory of the lighting controller 108.

In one example, the lighting controller 108 may turn on one or more of the light fixtures 102 when one or more of the occupants 126 is detected in a lighting area. The lighting controller 108 may detect one or more of the occupants 126 in the lighting area from the sensor data received from one or more of the sensors 104, from input data received from one or more of the input devices 106, from any other data that indicates the lighting area is occupied, or from a combination thereof. For example, the sensor data may indicate that one of the sensors 104 detected movement in the lighting area. The detected movement may indicate that one or more of the occupants 126 is in the lighting area. The lighting controller 108 may identify the light fixtures 102 that illuminate the lighting area and turn on the identified light fixtures 102 in response to detecting any of the occupants 126 in the lighting area. If, for example, no occupant is detected in the lighting area after a timeout value, such as 3 minutes, is reached, then the lighting controller 108 may time out the identified light fixtures 102.

Each of the light fixtures 102 may be timed out by changing the state of the light fixture after a timeout period passes or before the time indicated in the timeout value elapses. For example, the lighting controller 108 may turn the light fixture off if no motion is detected in the lighting area during the timeout period. Alternatively or in addition, the lighting controller 108 may change the brightness, color, or other characteristic of light generated by the light fixture if no occupant is detected in the lighting area during the timeout period. Alternatively or in addition, the lighting controller 108 may generate an audible sound if no occupant is detected in the lighting area during the timeout period. If no occupant is detected within a delay period after the audible sound is produced, the lighting controller 108 may turn the light fixture off.

In a particular lighting area, there may be a number of the sensors 104 and/or the light fixtures 102 that are grouped together. For example, if any of the sensors 104 in the group detect any occupant, then the light fixtures 102 in the group may be turned on in response. Thus, in one example, all of the sensors 104 in the group may have to detect no occupant for the duration of the timeout period in order for the light fixtures 102 to turn off. Alternatively or in addition, one of the light fixtures 102 may be paired with a corresponding one of the sensors 104, and the paired light fixture and sensor operate independently of the other light fixtures 102 and sensors 104.

However, timing out the identified light fixtures 102 may be erroneous if one or more of the occupants 126 is still in the lighting area, but is just not moving enough to trigger the sensor 104 or be otherwise detected. In general, erroneously timing out the light fixtures 102 is undesirable. A false-negative is a condition that occurs when any of the light fixtures 102 are timed out and the lighting area illuminated by the light fixtures 102 is determined to still be occupied at the time the light fixtures 102 are timed out.

The probability of the occupant remaining still and undetected over a longer period of time is lower than over a shorter period of time. Thus, one way to reduce the chance of the false-negative occurring is to simply increase the timeout value. However, simply increasing the timeout value may waste electricity, because after the occupants 126 leave the lighting area, the light fixtures 102 may remain on longer than with a smaller timeout value.

Motion sensors used for occupancy detection may cause false-negatives because the occupant may not move for extended periods of time. Whether the motion sensor is an infrared motion detector, an ultrasonic motion detector, an image-recognition sensor, a microphone-based motion detector, or any other type of motion detector, there may still be a chance for the occupant to go undetected. Indeed, any mechanism of detecting the occupants 126 may be imperfect and, consequently, may cause false-negatives.

As described in more detail below, the lighting controller 108 may detect the false-negatives. The lighting controller 108 may adjust the timeout value of one or more of the light fixtures 102 based on the false-negatives. The lighting controller 108 may balance the goal of keeping the number of false-negatives low with the goal of conserving energy.

2. Determining False-Negatives

The lighting controller 108 may detect the false-negatives from recorded sensor data obtained from recording the sensor data over a period of time. If one or more of the light fixtures 102 turns off while the occupant is still in the lighting area, the occupant may move in response. For example, the occupant may wave his or her hands or engage in some other action detectable by the sensors 104 so that the lighting controller 108 turns the light fixtures 102 back on. The movements made in response to the false-negative create a unique and detectable signature in the recorded motion data. The lighting controller 108 may detect the unique signature.

The recorded motion data may be stored in a memory of the lighting controller 108 or other memory. The recorded motion data may include one or more motion trips. The motion trip may indicate motion is detected. For example, the motion trip may occur when one of the sensors 104 detects motion or when one of the input devices 106 receives user input. The light fixtures 102 may be on or off at the time that the motion is detected. The recorded motion data may be gathered continuously in real-time by the lighting controller 108. Alternatively or in addition, the lighting controller 108 may receive the recorded motion data in batches or snapshots.

In one example, when the lighting controller 108 receives the sensor data, the lighting controller 108 may record a timestamp for each motion trip indicated in the sensor data. Alternatively or in addition, the timestamps may be included in the sensor data received by the lighting controller 108. In one example, the lighting controller 108 may store the identity of the sensor that caused the motion trip in the recorded sensor data. Alternatively or in addition, the lighting controller 108 may record the identity of a group of the sensors 104 that includes the sensor detecting the motion. For example, the lighting controller 108 may record the identity of a group of sensors 104 when movement detected by any sensor in the group of the sensors 104 results in the lighting controller 108 turning on any associated light fixtures 102.

The timestamps may be ordered sequentially by time. Each one of the timestamps may include a value indicating a point in time. Each one of the timestamps may include a unit of time, such as millisecond, second, minute, or clock cycle. Alternatively or in addition, each one of the timestamps may be dimensionless. For example, the timestamp may include a value of a counter.

The lighting controller 108 may subtract each timestamp from an immediately preceding timestamp in order to determine the duration or period of time between timestamps. Accordingly, the lighting controller 108 may determine multiple durations, where each respective one of the durations is a time difference between two consecutive motion trips. As described in more detail below, the lighting controller 108 may analyze the durations and determine how frequently various durations are found in the recorded sensor data. If the occurrence of motion in a lighting area is random, then the time between consecutive motion trips is random. However, if the occurrence of motion in the lighting area is caused by a regularly occurring event, such as a hand wave every time the light fixtures 102 are timed out, then there may be a spike in the frequency of durations just longer than the timeout value of the light fixtures 102. Thus, the lighting controller 108 may identify the false-negatives that occurred from a spike in the frequency of durations that are within a specified time range that follows the timeout value.

Figure 2:
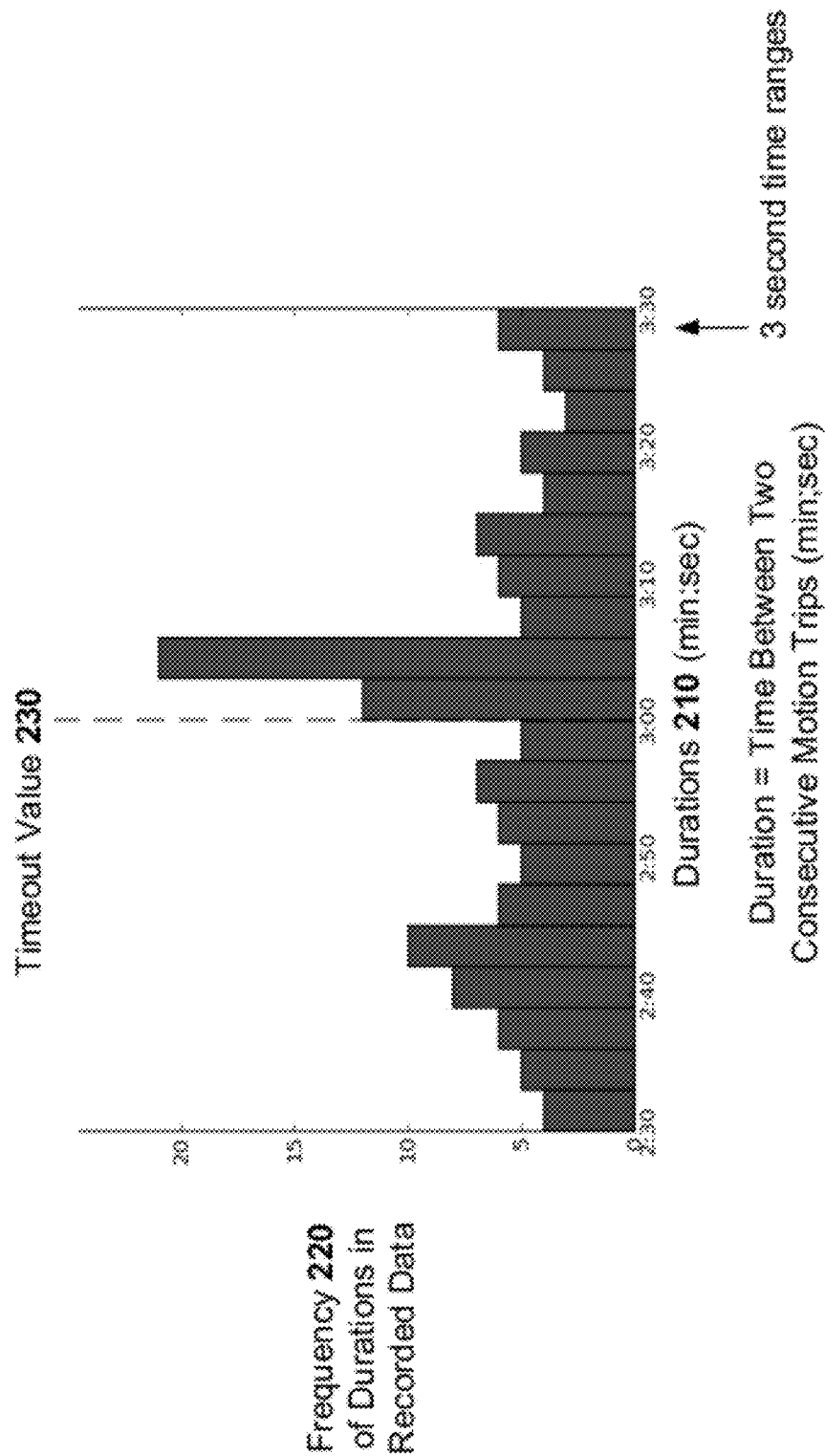
FIG. 2 illustrates a graph of durations and the frequency of each of the durations found in an example of the recorded sensor data.

FIG. 2 illustrates a graph of durations 210 and the frequency 220 of each of the durations 210 found in an example of the recorded sensor data. The durations 210 illustrated in FIG. 2 range from two minutes and thirty seconds to three minutes and thirty seconds. The durations 210 outside the range from two minutes and thirty seconds to three minutes and thirty seconds are not illustrated in FIG. 2. Although it is not apparent from FIG. 2, the average duration in the example recorded sensor data is 500 milliseconds. Thus, the frequencies of most of the durations found in the example recorded sensor data are not reflected in the graph. Instead, the graph in FIG. 2 focuses on the frequencies of the durations that are within thirty seconds of a timeout value 230, which is three minutes (3:00) in the example recorded sensor data.

A spike is visible in the frequency 220 of the durations 210 that are within a few seconds after the timeout value 230 of the light fixtures 102. For example, spikes in the frequency 220 of the durations 210 that follow the three minute timeout value 230 are twelve and twenty-two. That is, twelve durations 210 are in the time range from three minutes to three minutes and three seconds. Twenty-two durations 210 are in the time range from three minutes and three seconds to three minutes and six seconds. Because the recorded sensor data was received over time, the number of each of the durations 210 found in the recorded sensor data may be considered the frequency 220 of each of the durations 210. Alternatively or in addition, the frequency 220 of each of the durations 210 may be calculated by dividing the number of each of the durations 210 by the length of time the recorded sensor data is collected.

As described above, the motion trips may be caused by any detected movement. Accordingly, background motion trips may be caused by movement other than movement made in response to the light fixtures 102 timing out. For example, the background motion trips may be caused by shuffling papers, typing on a computer, leaving a room, or any other type of activity unrelated to the light fixtures 102 timing out. Background motion trips may result in durations 210 that are within a predetermined analysis time range. The analysis time range may be a time range that includes the timeout value 230. For example, the analysis time range may begin at 30 seconds before the timeout value 230 and end at 30 seconds after the timeout value 230. Alternatively or in addition, the analysis time range may be some other range of values that includes the timeout value 230. In FIG. 2, the frequency 220 of the durations 210 that are in the analysis time range (from two minutes thirty seconds to three minutes thirty seconds) averages about five. The durations caused by background motion trips may be considered background noise when detecting the false-negatives. The background noise may vary across the durations 210, as is readily apparent in FIG. 2.

The lighting controller 108, when determining the false-negatives, may account for the background noise. In one example, the lighting controller 108 may account for the background noise by subtracting the background noise from peaks in the frequency 220 to determine the false-negatives. For example, the lighting controller 108 may determine the number of false-negatives by subtracting the average frequency of the durations 210 over the analysis time range from the values immediately following the timeout value 230. Thus, the number of the false-negatives may be (12−5)+(22−5), or 24 total false-negatives. Alternatively or in addition, a more sophisticated curve fitting technique may be used to identify the peak and remove the background noise. Alternatively, the lighting controller 108 may not account for the background noise when determining the false-negatives.

The lighting controller 108 may apply any suitable mathematical analysis for detecting peaks in the frequencies of the durations 210 to identify whether there are any false-negatives, and if so, determining the false-negative rate. The false-negative rate may indicate the number of times per unit of time that the light fixture is timed out when the lighting area of the light fixture is determined to be occupied at the time the light fixture times out. In the example illustrated in FIG. 2, the lighting controller 108 may determine the false-negative rate as the total number of false negatives, which is 24, divided by the amount of time that the recorded sensor data is collected. Alternatively or in addition, the false-negative rate may be the number of false negatives, where the unit of time is the amount of time that the sensor data is collected.

There is no guarantee that a spike in the durations 210 immediately after the timeout value 230 is actually due to the occupants 126 responding to the timeout of one or more of the light fixtures 102. Something else may cause the motion trips in the few seconds after the light fixtures 102 time out. Indeed, there is usually background noise at any duration around the timeout value 230. However, given a sufficiently large sample of sensor data, movements made in response to the timeout are a likely cause of a spike that rises above the background noise.

3. Timeout Value Determined from False-Negative Rate

The false-negative rate provides a basis for an accurate, user-friendly, and tunable approach to optimize motion timeouts. The threshold false-negative rate may represent an amount of discomfort that is acceptable to the occupants 126. The discomfort is in the form of the light fixtures 102 timing out when the lighting area is occupied.

In one example, an operator of the control system may enter a threshold false-negative rate through the GUI 114. For example, the operator may be an administrator of the lighting system 100, an office occupant, or any other person. Accordingly, the lighting controller 108 may receive the threshold false-negative rate from the GUI 114. The false-negative rate may apply to the whole lighting system 100. Alternatively or in addition, the lighting controller 108 may receive one or more threshold false-negative rates from the GUI 114 that apply to corresponding subsets of the light fixtures 102. Alternatively or in addition, the lighting controller 108 may receive the threshold false-negative rate from a user input device, such as a potentiometer. Alternatively or in addition, the lighting controller 108 may generate the threshold false-negative rate from some other value, such as from a worker productivity goal or other management goal.

A management goal may be any aspect to consider in the overall control of lighting at one or more physical sites over time. Examples of management goals for the lighting system 100 include a productivity goal, a maintenance goal, an aesthetic goal, an energy goal, and any other objective considered in the control of lighting. The management goals for the lighting system 100 may include the productivity goal, the maintenance goal, the aesthetic goal, and the energy goal. The management goals for the lighting system 100 may include fewer, different, or additional goals. In a first example, the management goals may include just the productivity and the energy goals. In a second example, the management goals may include just the productivity goal, the aesthetic goal, and an operational cost goal.

A goal may include a value, a range of values, or a set of values. For example, the goal may include a maximum value, a minimum value, ranges of values, or any combination thereof. In one example, goals may include sub-goals.

The lighting controller 108 may control lighting based on the high-level management goals. An operator may set management goals, such as goals for worker productivity, system maintenance, energy savings, and/or aesthetic effect. The lighting controller 108 may include predictive models that translate the management goals into low-level device control parameters, such as light levels, power levels, and timeout values, for load devices, such as the light fixtures 102. The lighting controller 108 may control the light fixtures 102 with the device control parameters in order to best meet the management goals.

The lighting controller 108 may reduce energy usage by reducing the timeout value 230 as much as possible while keeping the false-negative rate under the threshold false-negative rate. The lighting controller 108 may increase the timeout value 230 in response to the false-negative rate being above the threshold false-negative rate. In contrast, the lighting controller 108 may decrease the timeout value 230 in response to the false-negative rate being below the threshold false-negative rate. The lighting controller 108 may keep the existing timeout value 230 if the false-negative rate matches the threshold false-negative rate.

In one example, the lighting controller 108 may start by setting the timeout value 230 to be a small value, such as 1 minute, for a few days or for any other determined period of time. Then the lighting controller 108 may set the timeout value 230 to be a large value, such as 30 minutes, for a few days or for any other determined period of time. For both timeout values, the lighting controller 108 may process the recorded sensor data and independently determine the false-negative rate for each of the timeout values. In general, the longer the timeout value 230, the lower the false-negative rate.

The lighting controller 108 may fit an equation to two points consisting of the timeout values and the corresponding false-negative rates. The lighting controller 108 may interpolate the timeout value 230 that corresponds to the threshold false-negative rate from the equation and the two points. The equation used for interpolation may be linear, polynomial, exponential, or some other form that substantially fits the observed data. The lighting controller 108 may set the timeout value 230 to the interpolated timeout value. Using the interpolated timeout value, the lighting controller 108 may then receive and record the sensor data and determine the false-negative rate that corresponds to the interpolated timeout value.

If the new false-negative rate matches the threshold timeout value, then the lighting controller 108 may keep the timeout value 230 set to the interpolated timeout value. Alternatively, the lighting controller 108 may add a third point, which comprises the interpolated timeout value and the corresponding false-negative rate, to the previously identified two points. The lighting controller 108 may fit a second equation to the three points. The lighting controller 108 may interpolate the timeout value 230 that corresponds to the threshold false-negative rate from the second equation and the three points. The process of interpolating the timeout value, collecting the sensor data, and determining the corresponding false-negative rate may repeat continuously. Alternatively, the process may repeat until the threshold false-negative rate is found.

Because occupant usage of the lighting area may change over time, the lighting controller 108 may operate continuously in order to find the best timeout value from the latest recorded sensor data. In one example, the older sensor data may be assigned less weight than newer sensor data, because the newer sensor data may be more representative of the current occupant usage.

The threshold false-negative rate is just one of several possible metrics that the lighting controller 108 may use to determine the timeout value 230. For example, the lighting controller 108 may use an energy usage threshold. The negative consequence of increasing the timeout value 230 is that increasing the timeout value 230 results in the light fixtures 102 consuming more energy. The energy usage threshold may indicate the maximum amount of energy that one or more of the light fixtures 102 are to consume. For example, the energy usage threshold may be expressed as a percentage of the amount of energy that the light fixtures 102 consume when lit 24 hours a day, seven days a week.

In one example, the lighting controller 108 may increase the timeout value 230 in response to the false-negative rate being above the threshold false-negative rate, but not if doing so causes the energy usage threshold to be exceeded. Energy usage of the light fixtures 102 may be determined from the sensor data received from the sensors 104, from energy consumption models, or any combination thereof.

In a second example, the lighting controller 108 may increase the timeout value 230 in response to the false-negative rate being above the threshold false-negative rate so long as a marginal decrease in the false-negative rate divided by a marginal increase in energy usage falls below a threshold value. The marginal decrease in the false-negative rate may be the amount that the false-negative rate falls if the timeout values 230 increases by a particular amount. The marginal increase in energy usage may be the amount that the energy usage increases if the timeout value 230 increases by the particular amount.

4. Detection of False-Negatives from Spatially Correlated Motion Data

Knowledge of the spatial orientation of the sensors 104 relative to each other and relative to the lighting areas in the physical space 118 may also enhance detection of the false-negatives. Specifically, there are types of motion that may cause motion trips to appear to be in response to the light fixtures 102 timing out, but the motion trips are instead unrelated to the light fixtures 102 timing out.

The following two types of motions are examples of such motions: (1) an occupant enters the lighting area immediately after the light fixtures 102 timed out; and (2) an occupant walks next to the lighting area, inadvertently tripping a motion sensor in the lighting area. For example, the latter passing-by type motion may occur when a private office has glass walls separating the office from a hallway, and a motion sensor in the private office is tripped by a person passing by the office.

The lighting controller 108 may detect the entering type of motion and the passing-by type of motion from the recorded sensor data. The lighting controller 108 may ignore the corresponding motion trips when determining the false negatives. For example, the lighting controller 108 may ignore motion trips detected by motion sensors within the lighting area that occur at substantially the same time as motion trips detected by motion sensors immediately adjacent to the lighting area that would be tripped if an occupant were walking into or next to the lighting area. The lighting controller 108 may evaluate each of the motion trips received from the sensors 104 in the lighting area. The lighting controller 108 may determine whether any motion trip received from an adjacent lighting area has a timestamp that is within a predetermined time window of the timestamp of the motion trip received from the sensors 104 in the lighting area. If so, then the lighting controller 108 may ignore the motion trip when determining the false-negatives. For example, the lighting controller 108 may ignore the motion trip when determining the durations 210 between motion trips. Examples of the predetermined time window include three seconds, five seconds, 10 seconds, or any other suitable timeframe.

These motion trips may be included in the background noise described above. Thus, accounting for the background noise may account for these two types of motions, but less accurately in some configurations.

In one example, the lighting controller 108 may include one or more models that detect types of motion and occupancy, and adjust the timeout value 230 accordingly. For example, one or more of the models may detect the entering type of motion, the passing-by type of motion, and other types of motion. Alternatively or in addition, the models may track the locations of the occupants 126 in the physical site 118. Examples of the models include an architecture model, a fixture model, an occupancy model, a demand model and an adaptive model.

The architecture model may include architectural data for locations, such as work spaces, work surfaces, transit corridors, and common areas, as well as the location and size of architectural features such as partitions, walls, doors, windows, vents, and work areas and surfaces. The fixture model may include architectural data about devices in the lighting system 100, such as the location and orientation of the light fixtures 102, the sensors 104, and the input devices 106. The adaptive model may include a component that identifies patterns over the medium or long term from system operation information, such as the sensor data and user input data received from the input devices 106.

The occupancy model may model occupancy per location in the physical site 118. Alternatively or in addition, the occupancy model may track the locations of the occupants 126 as the occupants 126 move throughout the physical site 118. For data sensed as events, such as motion data in the sensor data and user input received from the input devices 106, the occupancy model may employ conventional and enhanced detection and tracking models to determine the presence and movement of occupants 126 in the physical site 118.

Modeling may also compensate for sensor deficiencies. For practical reasons, motion sensing may be implemented with a sparse network of imprecise sensors. Coverage may be limited both in number and field of view, such as coverage of areas hidden by walls, doors, partitions, or other obstructions. Cost effective sensors, such as passive infrared (PIR) sensors, may only detect motion as a function of subtended angle and speed of motion. Motion detection itself may be limited in that an event only indicates that motion occurred somewhere in the field of view of the sensor without reporting information about the distance, direction, or location of the target. Detection sensitivity may be a function of target speed and distance from the sensor 104. In one example of a motion detector, a target that is far away must be larger, and move faster and farther, than one that is closer to the sensor for the same degree of detection.

The occupancy model may rely on conventional or enhanced target detection and tracking techniques. The occupancy model may integrate and interpret the sensor data from multiple neighboring sensors 104 over space and time. From the sensor data, the occupancy model may determine target candidates and an estimate of the dynamic state of the target candidates. The estimate of the dynamic state may be enhanced through models of the targets themselves, such as people or animals, based on factors such as maximum speed and likely changes in direction. The occupancy model may assign confidence factors to the targets and the states of the targets. Over time, with subsequent received sensor data and user input, the confidence in the state of the target may be reinforced or eroded. When a threshold is reached, in one direction or the other, the presence of the target is confirmed or eliminated.

The occupancy model may improve upon the performance of conventional techniques by correlating target proposals with site geometry, obtained from the architecture model. The occupants 126 may be constrained to certain locations and types of movement by site geometry. For example, the occupants 126 may be unable to walk through walls or may be expected to transit through doors, corridors, and stairs, and to be conveyed by elevators and escalators. Site geometry also facilitates prediction of inter-visibility between the sensors 104 and targets. Thus, the occupancy model may monitor the timing of both the motion indicated in the sensor data and events indicated in the user input across the data network 110, correlate the timing information with the site architecture, and determine the most likely location of the occupants 126. The occupancy model may also predict the most likely route of the occupants 126 through that location.

The fixture model may supplement the architecture model by modeling the placement of the input devices 106 in the physical site 118. Unlike motion detectors, which are rather imprecise, when an input device such as a wall control receives an input, the occupancy model may assume, with near certainty, the presence and location of an occupant in the physical site 118.

The occupancy model may further improve performance by incorporating occupant usage patterns provided in the patterns and statistics received from the adaptive model. The adaptive model may employ pattern detection and recognition over the medium or long term in order to identify patterns, such as occupancy and general movement patterns. For example, the adaptive model may learn a schedule of use of the physical site 118 by the occupants 126 based on detected patterns.

Accordingly, the occupancy model may receive the sensor data and the user input data, determine the spatial relationships between each of the sensors 104, and determine the spatial relationships between the sensors 104 and the light fixtures 102. Based on the received data and the spatial relationships, the occupancy model may distinguish between different types of movement from corresponding motion trip data signatures in the sensors data. For example, the occupancy model may detect the entering type of motion and the passing-by type of motion.

In addition, the occupancy model may determine the false-negative rate for the light fixture 102 from the sensor data, as described above. For example, the occupancy model may detect motion trips and determine the durations between the motions trips.

The demand model may determine an optimum solution for the timeout value 230 from lighting demands determined by the management goals and the other models, such as the occupancy model. For example, the demand model may adjust the timeout value based on the false-negative rate received from the occupancy model and the threshold false-negative rate received from the GUI 114 and/or derived from the management goals as described above.

5. Timeout Based on Type of Motion, Space, and Time Period

A walk-through motion may result from the occupant entering and then exiting a lighting area within a predetermined time period of entering. For example, the occupant may enter one entrance and exit a second entrance or, alternatively, the occupant may enter and exit the same entrance. In contrast, a walk-and-stay motion may result from the occupant entering and staying in the lighting area for longer than the predetermined time period after entering. A shorter timeout value 230 may be more appropriate for the walk-through motion than for the walk-and-stay motion. Therefore, the lighting controller 108 may adjust the timeout value 230 based on whether the walk-through motion or the walk-and-stay motion is detected. The occupancy model, for example, may detect and identify the walk-through motion and the walk-and-stay motion from the sensor data. The demand model, for example, may increase the timeout value 230 if the walk-and-stay motion is detected, but decrease the timeout value 230 if the walk-through motion is detected.

Figure 3:
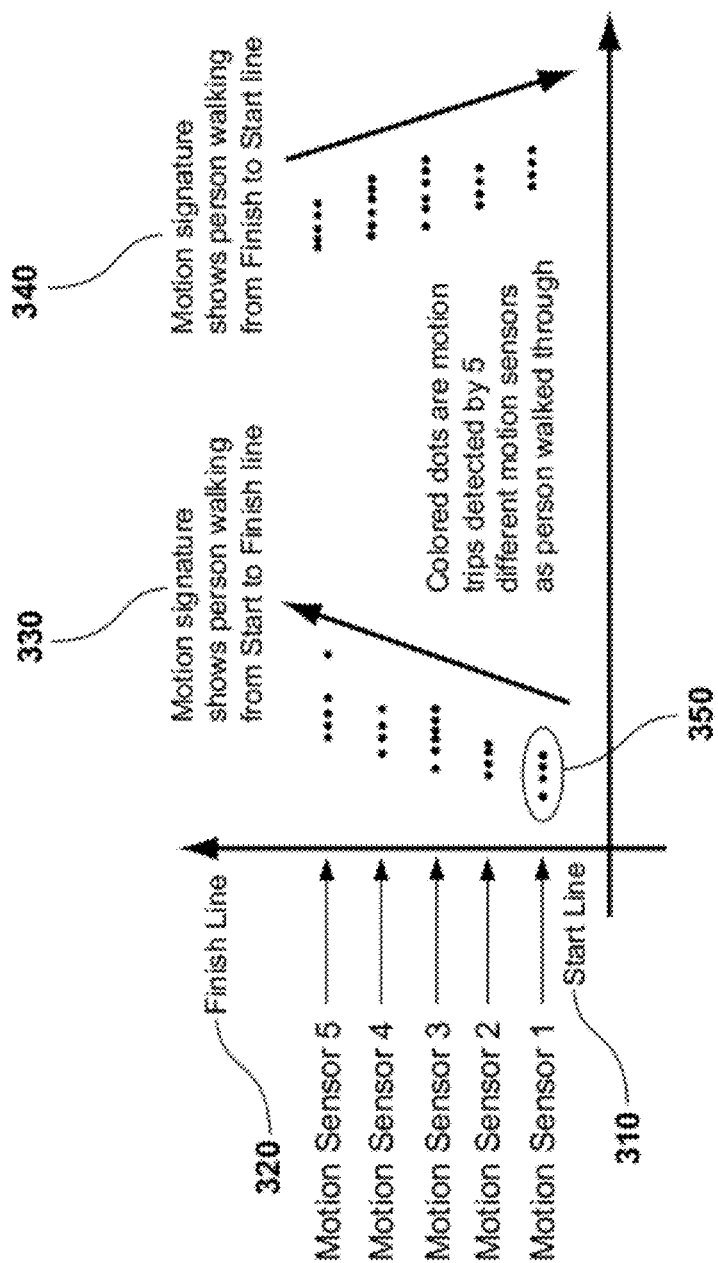
FIG. 3 illustrates an example of motion trips received from five motion sensors that are arranged in a row.

FIG. 3 illustrates an example of motion trips received from five motion sensors that are arranged in a row. The five motion sensors may be arranged from a start line 310 to a finish line 320. A first set 330 of motion trips generated by the five sensors are received when an occupant walks from the start line 310 to the finish line 320. A second set 340 of motion trips generated by the five sensors are received when an occupant walks from the finish line 320 to the start line 310.

As the occupant walks by one of the five sensors, the sensor generates a group of motion trips 350. As the occupant walks by the next one of the five sensors, the next sensor generates another group of motion trips, and so on until the occupant finishes walking past the last of the five sensors. The groups of motion trips may be staggered in time, such that the first motion trip in each consecutive one of the groups of motion trips may be received a short time after the first motion trip in the previous one of the groups of motion trips. Similarly, the last motion trip in each consecutive one of the groups of motion trips may be received a short time after the last motion trip in the previous one of the groups of motion trips. The short time delay may depend, for example, on the distance between the sensors 104, the speed the occupant walks by the sensors, and the detection range of each of the sensors 104.

The lighting controller 108 may detect a walk-through type of motion by detecting the set 330 or 340 of motion trips that include the staggered groups of motion trips received from the sensors 104 arranged along the path of the occupant. In contrast, the lighting controller 108 may detect a walk-and-stay type of motion by detecting one or more of the staggered groups of motion trips received from the sensors 104, but not the group of motion trips 350 from all of the sensors 104 arranged in the row. Thus, the occupancy model, the adaptive model, or both may detect the walk-through and walk-and-stay type motions.

The lighting controller 108 may process the sensor data received over a period of time and determine the probability that the sensor data includes one or more of the walk-through and walk-and-stay type motions. Any suitable mathematical analysis may be applied to determine the probability that the sensor data includes the walk-through and walk-and-stay type motions.

In response to detecting the walk-through type motion, the lighting controller 108 may decrease the timeout value 230. Alternatively or in addition, in response to determining that the number of detected motion trips caused by the walk-through type motions exceeds a predetermined percentage of the motions trips detected over a predetermined period of time, the lighting controller 108 may decrease the timeout value 230.

Correspondingly, in response to detecting the walk-and-stay type motion, the lighting controller 108 may increase the timeout value 230. Alternatively or in addition, in response to determining that the number of motion trips from the walk-and-stay type motions exceeds a predetermined percentage of the motions trips detected over a predetermined period of time, the lighting controller 108 may increase the timeout value 230.

In one example, alternative default timeout values may be used depending on whether the type of motions in the lighting area are predominately walk-through or walk-and-stay type motions. Alternatively or in addition, the lighting controller 108 may decrease or increase, respectively, the timeout value 230 that would otherwise be applied for the lighting area. For example, lower timeouts values may be more important in lighting areas that are characterized by rapid entry and exit, such as breakrooms, hallways, and restrooms.

The walk-through or entry/exit pattern may resemble the pattern illustrated in FIG. 3 if the sensors 104 are arranged linearly from an entry point to a different exit point. The sensors 104 may not be arranged linearly, but may instead be spaced apart in another pattern. Therefore, the lighting controller 108 may determine the orientation of the sensors 104 in the lighting area from the fixture model and determine what the walk-through and walk-and-stay motion signatures are for the particular arrangement of the sensors 104 with respect to the lighting area. For example, if a room only has one door, then the walk-through pattern may result in the motion sensor closest to the door being tripped at the beginning and at the end of the walk-through pattern, and the motion sensor or sensors inside the room being tripped in the middle of the walk-through pattern.

A facility manager may choose to optimize the timeout values based on space usage types. For example, lower default timeout values may be chosen for rapid entry/exit lighting areas, while higher default timeout values may be chosen for other types of uses of the lighting areas.

The lighting controller 108 may track the total occupancy of a room based on detection of the certain types of motions. For example, the occupancy model may increment an occupancy count for a room when the motion trips indicate an occupant enters the room. Alternatively or in addition, the occupancy model may decrement the occupancy count for the room when the motion trips indicate that the occupant exits the room. Whenever the occupancy count becomes zero, the lighting controller 108 may turn off the light fixtures 102 in the room, substantially reduce the timeout value 230 of the light fixtures 102 in the room, or take any other action based on the room being unoccupied.

The lighting controller 108 may adjust the timeout value 230 based on the time period, such as time of day, day of the week, and time of year. The reason is that occupancy patterns may change depending on the time period. For example, during a weeknight, the timeout value 230 may be set shorter than during the workday because the majority of motion trips may be due to a cleaning crew rapidly going from space to space. Instead of having a singular timeout across all time periods, the mechanisms for determining the timeout value 230 described herein, may create distinct timeout values and recognition patterns that vary across the time periods.

6. Clustering of Motion Trips

Figure 4:
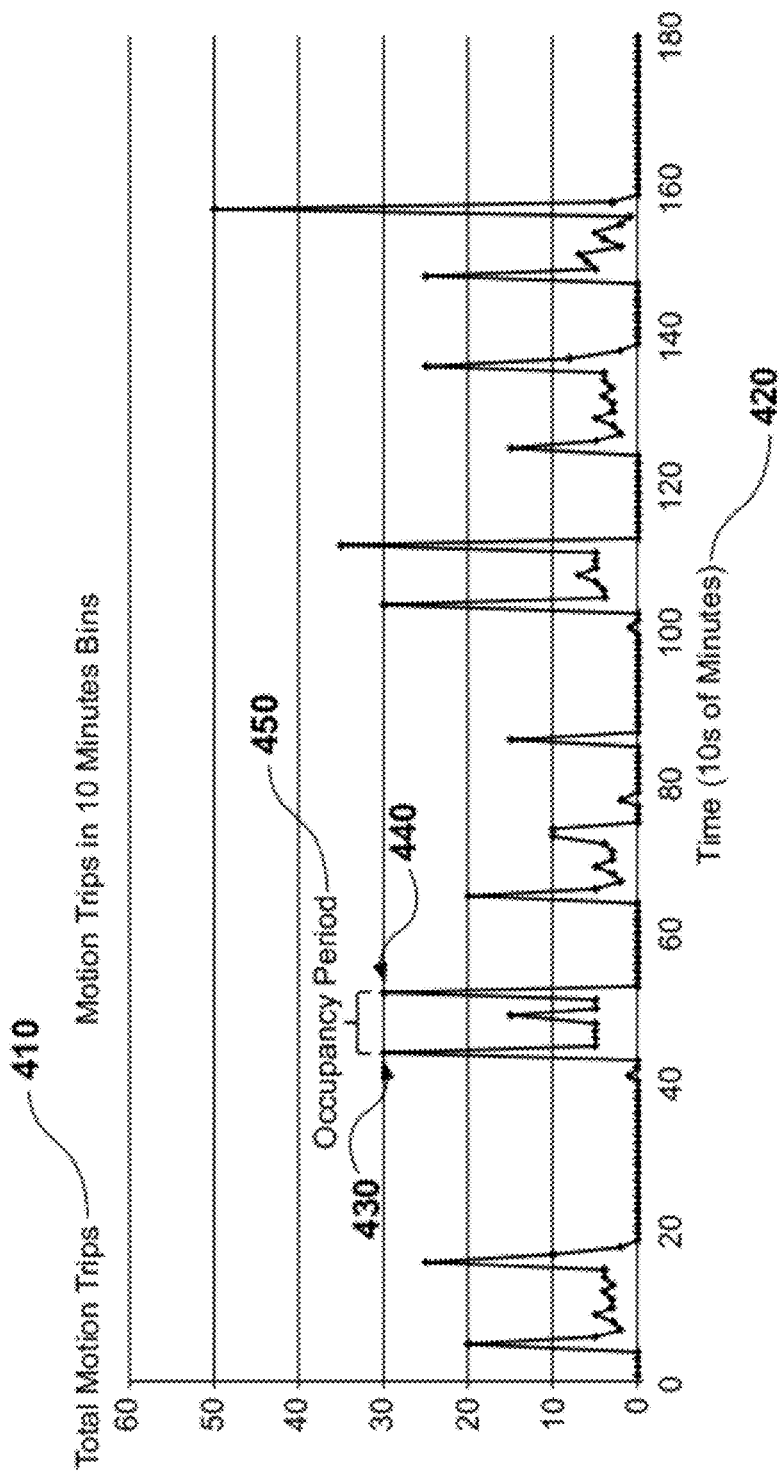
FIG. 4 illustrates an example of motion trips detected in a room and the time when the motion trips occurred.

FIG. 4 illustrates an example of motion trips 410 detected in a room and the time 420 when the motion trips 410 occurred. In some lighting areas, the motion trips 410 may be "clumpy," with spikes 430 and 440 demarking the beginning and end of a "clump" or cluster of the motion trips 410. The cluster of motion trips 410 between the spikes 430 and 440 may correspond to motion detected while the lighting area is occupied. Consider a conference room used for meetings. At the beginning of a meeting, the meeting attendees may enter the office, setting off many motion sensors causing a first spike 430 in the number of the motion trips 410. During the meeting, there may be some movement such as the presenter walking around or the attendees shuffling around in their seats. At the end of the meeting, the attendees may exit the conference room, again setting off many motion trips, causing a second spike 440 in the number of motion trips 410. The difference in time between the first spike 430 and the second spike 440 may indicate an occupancy period 450 during which the conference room is occupied. When the conference room is not being used for a meeting, there may be almost no motion trips. Thus, the clustering of the motion trips 410 may indicate when a lighting area is occupied. Conference rooms may exhibit more clustering than other lighting areas, such as private offices. Nevertheless, other areas, such as private offices, may also exhibit clustering, perhaps comprising clusters of longer duration than conference rooms.

If there is an identifiable level of clustering in the sensor data, the lighting controller 108 may process the motion trips 410 for a particular lighting area, and identify clusters by the twin-peak 430 and 440 signature described above. In particular, the lighting controller 108 may determine the occupancy period 450 of each cluster as illustrated in FIG. 4, ultimately arriving at a distribution of occupancy periods for the particular lighting area.

The distribution of occupancy periods for the particular lighting area may provide useful information. For example, the adaptive model may process motion trip data over time and determine each discrete occupancy period 450 for the lighting area. Thus, the adaptive model may dynamically determine a schedule of when the lighting area is used from the motion trips 410.

In one example, the distribution of occupancy periods may improve detection of exit type motions. The occupancy model may identify the entry spike 430 of a cluster in real-time by sensing that a number of the occupants 126 have entered the lighting area. After awhile, the occupancy model may detect a series of motion trips 410 that may or may not be the exit spike 440 caused by all the people leaving the conference room. The motion signature recognition may be unclear because, for example, the motion sensors may not be spatially located in a way that clearly detects an exit event. Nevertheless, the occupancy model may determine the occupancy period 450 that elapsed since the entry spike 430 and compare the occupancy period 450 to the historical distribution of occupancy periods received from the adaptive model. If the occupancy period 450 is less than the average historical occupancy period—or some other function of the historical occupancy period—then the occupancy model may determine that the latest set of motion trips 410 received is unlikely to be the exit spike 440. The occupancy model may then continue looking for the exit spike 440 in motion trips 410 that are subsequently received in real-time. Alternatively, if the occupancy period 450 detected in real-time is significantly longer than the average historical occupancy period—or some other function of the historical occupancy period—then the occupancy may determine that the series of motion trips is likely the exit spike 440. Accordingly, the lighting controller 108 may time out the light fixtures 102 immediately after, or within a predetermined time delay of, detecting the exit spike 440.

In a second example, the distribution of occupancy periods may be used to set the timeout value 230. The occupancy model may treat the distribution of occupancy periods as an ideal model of occupancy. If the adaptive model identifies the clusters, then the lighting area may likely be occupied during the occupancy periods 450 but not at other times. Therefore, the occupancy model may model a perfectly functioning motion detection system from the occupancy periods 450 received from the adaptive model. For example, the occupancy model may indicate that the lighting area is occupied when the current time is within one of the occupancy periods 450 and indicate that the lighting area is unoccupied when the current time is not in any of the occupancy periods 450. The lighting controller 108 may turn the light fixtures 102 on when the occupancy model indicates the lighting area is occupied, and turn the light fixtures 102 off anytime the occupancy model indicates the lighting area is unoccupied. For example, the demand model may turn the light fixtures 102 on when the current time falls in one of the clusters, and turn the light fixtures 102 off when the current time is anytime outside of the clusters. Alternatively or in addition, the demand model may use a short timeout value for the light fixtures 102 when the current time is anytime outside of the clusters.

Another use for the distribution of occupancy periods is in modeling how much energy may be reduced if the motion sensors were to detect occupancy without error. Ideal energy use may be determined by multiplying the occupancy periods 450 in the occupancy schedule by a known power consumption rate of the light fixtures 102. The ideal energy use may be compared to an amount of energy consumed by the light fixtures 102 in a configuration where motion detection worked imperfectly resulting in false-negatives.

Alternatively or in addition, the occupancy model may determine the distribution of occupancy periods for a lighting area from information received from a calendaring system, such as a MICROSOFT EXCHANGE SERVER®, which is a registered trademark of Microsoft Corporation, Redmond, Wash., or any other system that stores calendar information, such as meeting times. For example, the lighting controller 108 may communicate with the calendaring system over the data network 110 or any other communications network. For example, the lighting controller 108 may determine that a meeting is scheduled for a particular time period at a location that includes, or is included in, the lighting area. The lighting controller 108 may determine that the time period of the scheduled meeting is one of the occupancy periods for the lighting area. The lighting controller 108 may receive meeting information using a messaging protocol such as Messaging Application Programming Interface (MAPI), Google Calendar Data API (application programming interface), CalDAV, or any other protocol for receiving or exchanging calendar information.

7. Timeout Value Adjustment in Response to Abnormal Event

The lighting controller 108 may detect unusual situations and rapidly adjust the timeout value 230 in response. For example, the lighting controller 108 may receive the occupancy schedule from the adaptive model as described above. Alternatively or in addition, the lighting controller 108 may receive the occupancy schedule from the GUI 114.

The lighting controller 108 may use a shorter timeout value for times when the lighting area is unoccupied according to the occupancy schedule, than for times when the occupancy schedule indicates the lighting area is occupied. For example, the lighting controller 108 may shorten the timeout value 230 currently in use for the lighting area at night if the lighting area is not scheduled to be in use. Light and temporary usage from cleaning crews and security moving quickly through the lighting area may do so when the lighting area is scheduled not to be in use. The shortened timeout value 230 may not be an issue for the light and temporary usage.

However, the shortened timeout value 230 may be an issue for unscheduled, continuous use of the lighting area. For example, an employee might be working later than usual one night. The employee might be uncomfortable with the shortened timeout value of, for example, 30 seconds, instead of the usual timeout value of, for example, 5 minutes. The employee may have the impression that the light fixtures 102 are constantly being turned off while the employee is working late if the shortened timeout value is used.

In one example, the employee may have full individual policy control over timeout value 230 and the occupancy scheduling through the GUI 114. However, the employee may set the timeout value 230 at night (or unscheduled usage time) to the same value as the timeout value 230 at the daytime (or schedule usage time), because the employee prefers the longer timeout value 230. The employee may have little or no incentive to use a shorter timeout value 230 for some time periods, because the shorter timeout may be a potential annoyance to the employee.

In a second example, the administrator of the lighting system 100 may set the timeout values for scheduled and unscheduled usage times. Alternatively or in addition, the administrator of the lighting system 100 may set a maximum threshold for the timeout value 230 that other users, such as the employee, may not exceed. The GUI 114 may include an override button that allows a user to override the timeout value 230 for a predetermined amount of time, such as for the remainder of the day.

In a third example, the lighting controller 108 may "learn" an optimal timeout value for a particular segment of time during the unscheduled usage by identifying false-negatives in the motion trips 410. However, the lighting controller 108 may collect the motion trip data over a long period of time, thus making it difficult to respond quickly to an unusual usage situation. Because the lighting controller 108 is attempting to address an atypical situation, acting on data collected in real-time may improve the effectiveness of identifying the optimal timeout value.

In a fourth example, the lighting controller 108 may analyze the motion trips 410 collected in real-time. The lighting controller 108 may determine whether an atypical situation signature appears in the motion trips 410. For example, the lighting controller 108 may detect an atypical situation if over a predetermined time span during the unscheduled usage time, such as over a 30 minute time span at night, the lighting controller 108 identifies an unusually large number of false-negatives relative to other predetermined time spans. The lighting controller 108 may take aggressive action to increase the timeout value 230 for the next X hours, or for some other predetermined amount of time. In order to determine what constitutes an unusually large number of false-negatives, the lighting controller 108 may record the motion trips 410 for extended periods of time, such as days or weeks. The aggressive action may include increasing the timeout value 230 by a predetermined increment for each false-negative that is detected during the unscheduled usage time. Alternatively or in addition, the aggressive action may include increasing the timeout value 230 to a very large value, such as 30 minutes, in response to the first false-negative detected during the unscheduled usage time. Any other suitable mechanism that uses real-time data as the basis for setting the time out value 230 and that prioritizes the reduction of false-negatives over energy savings may be used.

In a fifth example, the lighting controller 108 may make no distinction between typical and atypical data by adjusting the timeout value 230 based on the sensor data collected in the last few minutes or over some other relatively short period of time. For example, the lighting controller 108 may calculate a moving average of the false-negative rate based on the sensor data received recently, such as within the last ten minutes. Thus, the moving average of the false-negative rate puts more weight on recently received sensor data. Alternatively or in addition, the lighting controller 108 may determine the false-negative rate using any other suitable mechanism for weighting recently received sensor data more than sensor data received less recently. If the lighting controller 108 determines that false-negatives occurred in the last few minutes, then the lighting controller 108 determines whether the number of false-negatives in that period of time is acceptable or unacceptable, and adjusts the timeout value 230 accordingly. For example, the lighting controller 108 may determine that the frequency of the false-negatives is acceptable if the frequency of the false-negatives is less than the threshold false-negative rate. Accordingly, the lighting controller 108 may adjust the timeout value 230 in view of both the sensor data collected over days or weeks that may identify historical trends and the recently collected sensor data that may identify the atypical situation.

8. Effect of Timeout Value Changes on Energy Consumption

As described above, the lighting controller 108 may adjust the timeout value 230 based on the energy usage threshold. The energy usage threshold may indicate the maximum amount of energy that one or more of the light fixtures 102 are to consume. Therefore, it may be desirable to determine the amount of energy that the light fixtures 102 would consume if the timeout value 230 were increased. As explained below, the lighting controller 108 may determine the amount of energy that the light fixtures 102 would consume based on the timestamps of the motion trips collected over a period of time.

The "cost" of increasing the timeout value 230 is "wasted" energy use by light fixtures 102 that are turned on when the lighting area is actually unoccupied. Determining the "wasted energy per increase in timeout" may be useful for a facility manager who desires to weigh this cost against occupant discomfort, such as the light fixtures 102 turning off while the occupant is present due to imperfect sensing.

The lighting controller 108 may record the motion trips 410 for an extended period of time, such as for one week, using the smallest timeout value (timeout value A) that may likely be selected for the lighting area. The lighting controller 108 may determine, from the recorded motion trips, what the relative energy usage would be if a larger timeout value (timeout value B) were used instead during the same period of time that the recorded motion trips 410 were collected.

Figure 5:
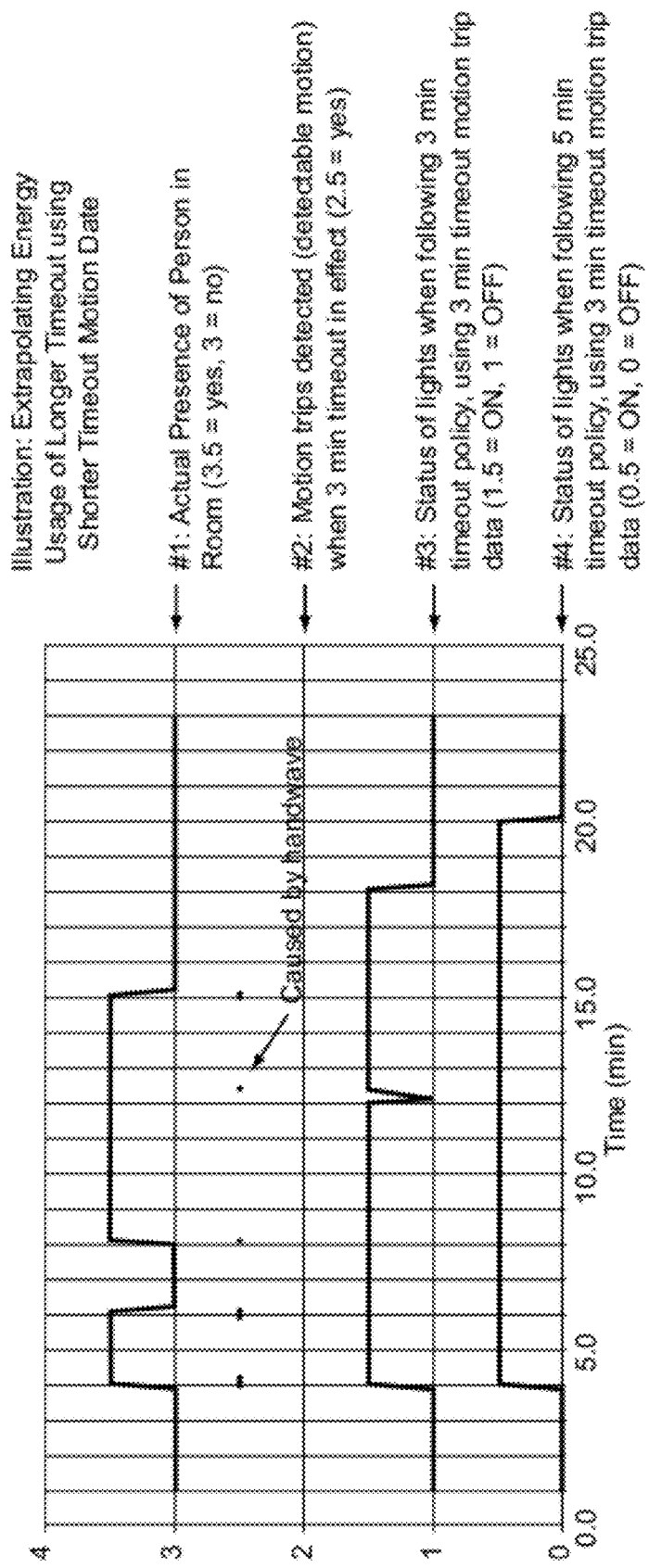
FIG. 5 illustrates an example of using timestamps associated with motion trips generated using one timeout value in order to determine when the light fixtures would be on if a second, longer, timeout value were used.

FIG. 5 illustrates an example of using timestamps associated with motion trips generated using one timeout value in order to determine when the light fixtures 102 would be on if a second, longer, timeout value were used. The lighting controller 108 may determine the total amount of time that the light fixtures 102 are on when timeout value A is used. For each timestamp in the recorded motion trips, the lighting controller 108 may determine a time block having a start time and an end time. For each time block, the start time may be the timestamp associated with the corresponding motion trip. For each time block, the end time may be the sum of the timestamp and timeout value A. The lighting controller 108 may find the union of all of the time blocks for timeout value A. The union of two time blocks, $(Start_1, End_1)$ and $(Start_2, End_2)$, results in a single time block if the time blocks overlap, but otherwise results in two time blocks. For example, if $Start_1$ is less than $Start_2$ and $End_1$ is greater than $Start_2$ but less than $End_2$, then the union of the two blocks is a single time block, $(Start_1, End_2)$. Alternatively, if $Start_1$ and $End_1$ are both less than $Start_2$, then the union of the two blocks results in the same two time blocks, $(Start_1, End_1)$ and $(Start_2, End_2)$. The total duration of the union of all of the time blocks for timeout value A may be Duration A. Duration A represents the amount of time that the light fixtures 102 are on when timeout value A is used.

Similarly, the lighting controller 108 may determine the total amount of time that the light fixtures 102 may be on when timeout value B is selected. For each timestamp in the recorded motion trips, the lighting controller 108 may determine a time block having a start time and an end time. For each time block, the start time may be the timestamp corresponding to the motion trip. For each time block, the end time may be the sum of the corresponding timestamp and timeout value B. The lighting controller 108 may find the union of all of the time blocks for timeout value B. The total duration of the union all of the time blocks for timeout value B may be Duration B. Duration B represents the amount of time that the light fixtures 102 are on when timeout value B is used.

Under most energy consumption models, the amount of energy consumed by the light fixtures 102 is proportional to the amount of time that the light fixtures 102 are on. Accordingly, the ratio of Duration A to Duration B may be equal to the ratio of the amount of energy consumed using timeout value A to the amount of energy consumed using timeout value B. Therefore, if the lighting controller 108 determines the amount of energy consumed using timeout value A, then the lighting controller 108 may determine the amount of energy that would be consumed using timeout value B.

Accordingly, the lighting controller 108 may use the technique to determine a new timeout value that would result in one or more of the light fixtures 102 consuming energy substantially equal to the energy usage threshold. The lighting controller 108 may determine whether the new timeout value satisfies the threshold false-negative rate as described above in an earlier section.

Figure 6:
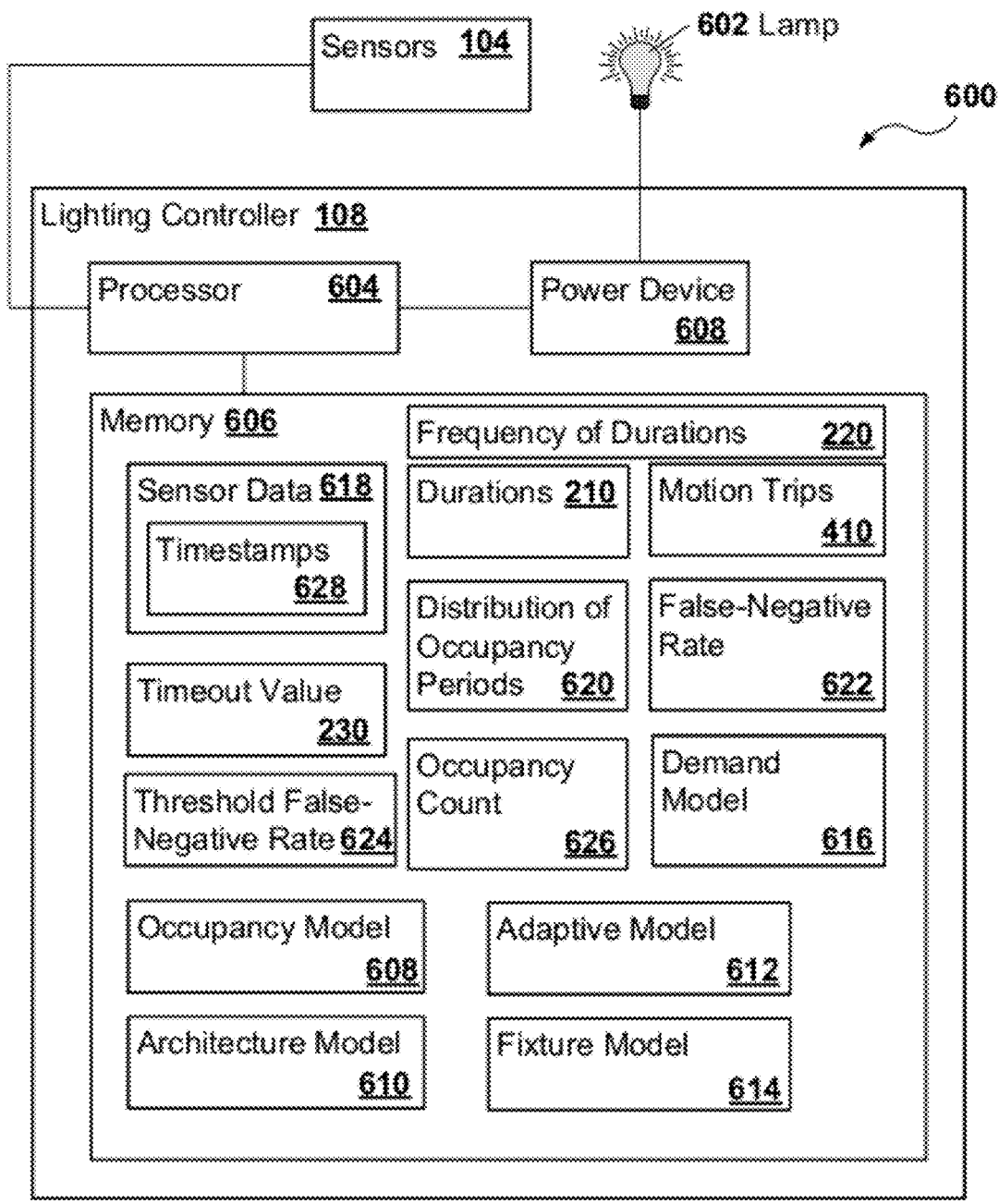
FIG. 6 illustrates an example of a hardware diagram of the control system.

FIG. 6 illustrates an example of a hardware diagram of the control system 600 and supporting entities such as one or more of the sensors 104 and a lamp 602. The control system 600 may include the lighting controller 108. In one example, the control system 600 may include multiple lighting controllers in communication with each other over a communications network, such as the data network in the lighting system 100, that implement the control system 600 together.

The supporting entities may include additional, fewer, or different components. For example the supporting entities may include multiple light fixtures 102, where each one of the light fixtures 102 includes one or more lamps, such as the lamp 602.

The lighting controller 108 may include a processor 604, a memory 606 and a power device 608. The lighting controller 108 may include additional, fewer, or different components. For example, the lighting controller 108 may include a display device. In a second example, the lighting controller 108 may not include the power device 608, and instead communicate with a physically discrete power device that is in a different physical package than the lighting controller 108.

The power device 608 may be any device or combination of devices that powers one or more load devices, such as the lamp 602 or the light fixtures 102. In one example, the power device 608 may both power and communicate with the load devices. In a second example, the power device 608 may power the load devices while the lighting controller 108 communicates with the load devices and the power device 608. In a third example, the lighting controller 108 may include the power device 608. In a fourth example, the lighting controller 108 may be in communication with the power device 608, where the two are separate devices. In a fifth example, the power device may be a switch, such as solid-state relay or a mechanical relay switch.

The memory 606 may hold the programs and processes that implement the logic described above for execution by the processor 604. As examples, the memory 606 may store program logic that implements components of the lighting controller 108, such as the occupancy model 608, the architecture model 610, the adaptive model 612, the fixture model 614, and the demand model 616, or any other logic component of the lighting controller 108. The components of the lighting controller 108, when executed by the processor 604, may perform the features of the lighting controller 108 described herein. The memory 606 may include data structures and values such as the sensor data 618, the durations 210, the motion trips 410, the frequency of durations 230, the distribution of occupancy periods 620, the false-negative rate 622, the timeout value 230, the threshold false negative rate 624, the occupancy count 626, any other values. For example, the sensor data 618 may include the timestamps 628 corresponding to when the sensor data 618 was sensed or when the sensor data 618 was received by the lighting controller 108.

The systems 100 and 600 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network. Alternatively or in addition, any of the logic components, such as the occupancy model 608 or any other module, may be implemented as a discrete circuit or as logic in an FPGA or an application specific integrated circuit (ASIC).

The systems 100 and 600 may be implemented with additional, different, or fewer entities. As one example, the processor 604 may be implemented as a microprocessor, a microcontroller, a DSP, an application specific integrated circuit (ASIC), discrete logic, or a combination of other types of circuits or logic. As another example, the memory 606 may include non-volatile and/or volatile memory, such as a random access memory (RAM), a read-only memory (ROM), an erasable programmable read-only memory (EPROM), flash memory, any other type of memory now known or later discovered, or any combination thereof. The memory 606 may include an optical, magnetic (hard-drive) or any other form of data storage device.

The processing capability of the systems 100 and 600 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may be implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that determines the distribution of the occupancy periods 620. As another example, the DLL may itself provide all or some of the functionality of the systems 100 and 600.

The processor 604 may be in communication with the memory 606, one or more of the sensors 104 and the power device 608. In one example, the processor 604 may also be in communication with additional elements, such as a display. The processor 604 may include a general processor, central processing unit, server, application specific integrated circuit (ASIC), digital signal processor, field programmable gate array (FPGA), digital circuit, analog circuit, any other hardware that executes logic, or any combination thereof.

For example, the processor 604 may include one or more devices operable to execute computer executable instructions or computer code embodied in the memory 606 or in other memory to perform the features of the lighting controller 108. The computer code may include instructions executable with the processor 604. The computer code may include embedded logic. The computer code may be written in any computer language now known or later discovered, such as hardware description language (HDL), C++, C#, Java, Pascal, Visual Basic, Perl, HyperText Markup Language (HTML), JavaScript, assembly language, shell script, or any combination thereof. The computer code may include source code and/or compiled code.

Figure 7:
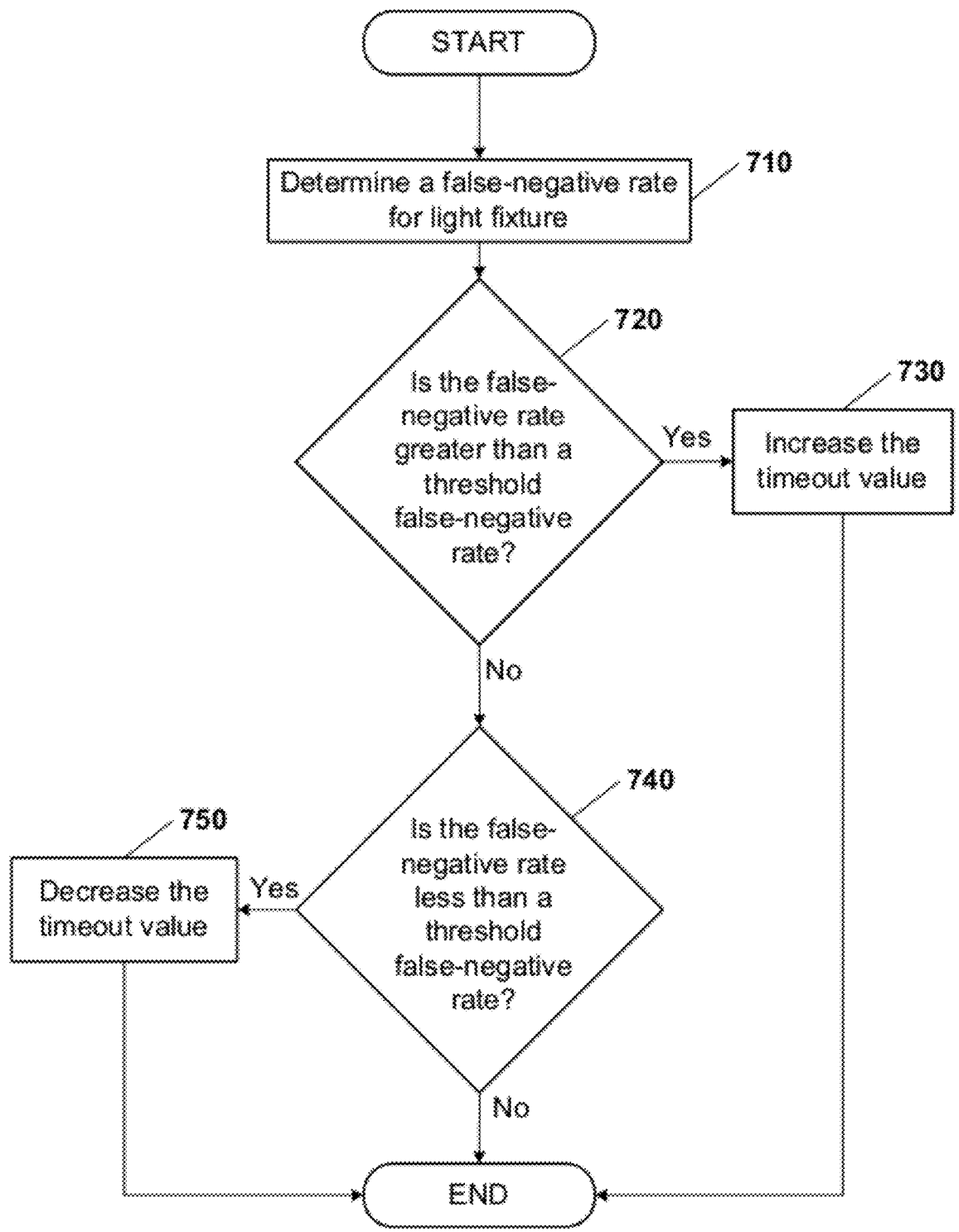
FIG. 7 illustrates an example flow diagram of the logic of the control system.

FIG. 7 illustrates an example flow diagram of the logic of the control system 600. The logic may include additional, different, or fewer operations. The operations may be executed in a different order than illustrated in FIG. 7.

The false-negative rate 622 for the lamp 602 may be determined from sensor data 618, where the false-negative rate 622 is a frequency at which the lamp 602 is timed out when the lighting area is occupied (710). The false-negative rate 622 may be determined using any number of mechanisms.

A determination may be made whether the false-negative rate 622 is greater than the threshold false-negative rate 624 (720). If the false-negative rate 622 is greater than the threshold false-negative rate 624, then the timeout value 230 of the lamp 602 may be increased (730).

Alternatively, a determination may be made whether the false-negative rate 622 is less than the threshold false-negative rate 624 (740). If the false-negative rate 622 is less than the threshold false-negative rate 624, then the timeout value 230 of the lamp 602 may be decreased in response (750).

In one example, the operations may end if the false-negative rate 622 is increased or decreased in response to the false-negative rate 622 being less than or greater than the threshold false-negative rate 624. The operations may end if the false-negative rate 622 equals the threshold false-negative rate 624. Alternatively or in addition, the operations may continue indefinitely by returning to determine the false-negative rate 622 again (710) instead of ending. Additional sensor data may be received and used to determine the false-negative rate 622 again.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device. Moreover, the various modules and screen display functionality is but one example of such functionality and any other configurations encompassing similar functionality are possible. For example, references to the light fixtures 102 may also be understood to apply to one or more lamps within the light fixtures 102. For example, the lighting controller 108 may adjust the timeout value 230 of the lamp 602 instead of or in addition to the timeout value 230 of the light fixture that includes the lamp 602.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A lighting controller for adjusting a timeout value of a lamp, which illuminates a lighting area, the lighting controller comprising:
   a memory comprising sensor data that includes a plurality of motion trips; and
   an occupancy model configured to determine a plurality of durations from the plurality of motion trips, wherein each respective one of the durations is a time difference between two consecutive motion trips that are in the plurality of motion trips, wherein the occupancy model is further configured to determine a false-negative rate for the lamp based on a detection of a peak in a frequency of the durations that are in a predetermined time range as compared to a frequency of the durations that are outside of the predetermined time range, the predetermined time range including values larger than the timeout value of the lamp, the false-negative rate representing a frequency at which the lamp is timed out when the lighting area is occupied; and
   a demand model configured to increase the timeout value of the lamp in response to the false-negative rate being above a threshold false-negative rate, and to decrease the timeout value of the lamp in response to the false-negative rate being below the threshold false-negative rate.

2. The lighting controller of claim 1, wherein the occupancy model is further configured to determine the false-negative rate based on the durations that are outside of the predetermined time range, the durations outside of the predetermined time range being caused by background motion trips.

3. The lighting controller of claim 1, wherein the occupancy model is further configured to determine which motion trips are not false-negatives based on spatial orientation information about a plurality of sensors that generated the motion trips.

4. The lighting controller of claim 1, wherein the occupancy model is further configured to exclude the motion trips caused by walk-through motions from the determination of the durations.

5. The lighting controller of claim 1, wherein the occupancy model is further configured to:
   maintain an occupancy count of the lighting area based on detection of entries to the lighting area and exits from the lighting area, wherein the occupancy model detects entries and exits from the sensor data; and
   reduce the timeout value in response to a determination that the occupancy count of the lighting area becomes zero.

6. The lighting controller of claim 1, wherein:
   the occupancy model is further configured to determine a first false-negative rate from the sensor data for a first light fixture that includes the lamp and a second false-negative rate for a second light fixture that operates independently of the first light fixture outside of the lighting area; and
   the demand model is further configured to adjust a first timeout value of the first light fixture based on a comparison of the first false-negative rate with the threshold false-negative rate and to adjust a second timeout value of the second light fixture based on a comparison of the second false-negative rate with the threshold false-negative rate.

7. A tangible non-transitory computer-readable medium encoded with computer executable instructions that adjust a timeout value of a lamp that illuminates a lighting area, the computer executable instructions executable with a processor, the computer-readable medium comprising:

instructions executable to determine a plurality of durations from a plurality of motion trips, wherein each respective one of the durations is a time difference between two consecutive motion trips that are in the plurality of motion trips;

instructions executable to determine a false-negative rate for the lamp based on a determination that a frequency of the durations within a predetermined time range is higher than a frequency of the durations outside of the predetermined time range, the predetermined time range including values larger than the timeout value of the lamp, the false-negative rate including a frequency at which the lamp is timed out when the lighting area is occupied;

instructions executable to increase the timeout value of the lamp in response to a determination that the false-negative rate is above a threshold false-negative rate; and instructions executable to decrease the timeout value of the lamp in response to a determination that the false-negative rate is below the threshold false-negative rate.

8. The tangible non-transitory computer-readable medium of claim 7, wherein the computer-readable medium further comprises instructions executable to override the timeout value in response to a determination that the lighting area is occupied during unscheduled usage time periods.

9. The tangible non-transitory computer-readable medium of claim 7, wherein the computer-readable medium further comprises instructions executable to set the timeout value depending on the time of day.

10. The tangible non-transitory computer-readable medium of claim 7, wherein the computer-readable medium further comprises instructions executable to set the threshold false-negative rate based on a space usage of the lighting area.

11. The tangible non-transitory computer-readable medium of claim 7, wherein the computer-readable medium further comprises instructions executable to adjust the timeout value based on a current time at the lighting area being in an occupancy period.

12. The tangible non-transitory computer-readable medium of claim 7, wherein the computer-readable medium further comprises instructions executable to determine an occupancy period of the lighting area from a cluster of motion trips included in the sensor data.

13. The tangible non-transitory computer-readable medium of claim 7, wherein an equation is fit to at least two points, each of the at least two points comprising a respective timeout value and a respective false-negative rate determined to correspond to the respective timeout value, wherein the timeout value is set to an interpolated timeout value that corresponds to the threshold false-negative rate on a line determined by the equation fit to the at least two points.

14. A computer-implemented method to adjust a timeout value of a lamp that illuminates a lighting area, the method comprising:

determining a false-negative rate for the lamp from sensor data with a processor, the false-negative rate being a frequency at which the lamp is timed out when the lighting area is occupied;

determining an amount of energy that the lamp would consume at an increased timeout value of the lamp from timestamps associated with motion trips stored while the timeout value of the lamp is an initial timeout value, the initial timeout value being less than the increased timeout value, wherein each one of the motion trips indicates motion in the lighting area is detected;

increasing the timeout value of the lamp with the processor to the increased timeout value in response to the false-negative rate being above a threshold false-negative rate and a determination that the amount of energy is below a threshold; and decreasing the timeout value of the lamp with the processor in response to the false-negative rate being below the threshold false-negative rate.

15. The method of claim 14 further comprising keeping the false-negative rate substantially at the threshold false-negative rate by repeatedly determining the false-negative rate from the sensor data and adjusting the timeout value of the lamp depending on whether the false-negative rate is greater than or less than the threshold false-negative rate.

16. The method of claim 14, wherein increasing the timeout value comprises increasing the timeout value in response to the false-negative rate being above the threshold false-negative rate and in response to a marginal decrease in the false-negative rate divided by a marginal increase in energy usage being below a threshold value, wherein the marginal decrease in the false-negative rate is an amount that the false-negative rate decreases if the timeout value increases a particular amount, and wherein the marginal increase in energy usage is an amount that the energy usage increases if the timeout value increases the particular amount.

17. The method of claim 14, wherein decreasing the timeout value of the lamp comprises determining a decreased timeout value with the processor by interpolating false-negatives rates previously determined from previously set timeout values.

18. The method of claim 14, wherein determining the false-negative rate from sensor data comprises weighting sensor data based on when the sensor data is received.

19. The method of claim 14 further comprising increasing the timeout value of the lamp in response to detecting a walk-and-stay motion.

20. The method of claim 14 further comprising decreasing the timeout value of the lamp in response to detecting a walk-through motion.

21. A computer-implemented method to optimize modify a timeout value of a lamp that illuminates a lighting area, the method comprising:

detecting a plurality of motion trips with a processor, wherein each one of the motion trips indicates motion in the lighting area is detected, and wherein a time at which the motion is detected is associated with each respective one of the motion trips;

determining a plurality of durations with the processor, wherein each respective one of the durations is a time difference between two consecutive detected motion trips;

determining how many of the durations are within a first time range with the processor, the first time range including values larger than the timeout value of the lamp;

determining how many of the durations are within a second time range with the processor for determination of background motion trips;

determining, with the processor, how many false-negatives occurred based on the determined number of durations in the first time range being higher than the determined number of durations in the second time range, the false-negatives being an indication that the lamp is timed out while the lighting area is occupied; and adjusting the timeout value of the lamp with the processor based on the determined number of the false-negatives.

* * * * *

UNITED STATES PATENT AND TRADEMARK OFFICE
CERTIFICATE OF CORRECTION

PATENT NO. : 8,538,596 B2  
APPLICATION NO. : 12/973425  
DATED : September 17, 2013  
INVENTOR(S) : Gu et al.

Page 1 of 1

It is certified that error appears in the above-identified patent and that said Letters Patent is hereby corrected as shown below:

In the Claims:
Column 26, Claim 21, Line 39:
    Please correct "method to optimize modify a"
        to read -- method to modify a --

Signed and Sealed this
Eighteenth Day of March, 2014

Michelle K. Lee
*Deputy Director of the United States Patent and Trademark Office*